US012693970B2

(12) United States Patent
Palanisamy

(10) Patent No.: US 12,693,970 B2
(45) Date of Patent: Jul. 28, 2026

(54) SERIAL PERIPHERAL INTERFACE TO MULTIPLE MEMORY TYPES

(71) Applicant: ADVANCED MICRO DEVICES, INC., Santa Clara, CA (US)

(72) Inventor: Kanda K. Palanisamy, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/902,243

(22) Filed: Sep. 30, 2024

(65) Prior Publication Data

US 2026/0093619 A1 Apr. 2, 2026

(51) Int. Cl.
*G06F 12/02* (2006.01)

(52) U.S. Cl.
CPC ................................ *G06F 12/0246* (2013.01)

(58) Field of Classification Search
CPC ............................ G06F 12/0246; G06F 12/02
USPC ......................................................... 711/103
See application file for complete search history.

(56) References Cited

U.S. PATENT DOCUMENTS

| | | | | |
|---|---|---|---|---|
| 11,048,654 B2 * | 6/2021 | Chen | ................... | G06F 13/1689 |
| 2005/0015565 A1 * | 1/2005 | Ryan | ................... | G06F 12/0292 |
| | | | | 711/202 |
| 2008/0256305 A1 * | 10/2008 | Kwon | ................... | G06F 15/167 |
| | | | | 711/147 |
| 2009/0103364 A1 * | 4/2009 | Pekny | ................ | G06F 12/0804 |
| | | | | 365/185.17 |
| 2023/0060322 A1 * | 3/2023 | Springberg | ........... | G06F 3/0659 |
| 2025/0190359 A1 * | 6/2025 | Kim | ................... | G06F 12/0284 |

* cited by examiner

*Primary Examiner* — Jared I Rutz
*Assistant Examiner* — Edward Waddy, Jr.

(57) ABSTRACT

An apparatus includes one or more controller circuits that are configured to be coupled to a first memory that implements random access and a second memory that implements serial access. A processing unit is configured to generate a map indicating a first set of addresses allocated to the first memory and a second set of addresses allocated to the second memory. The processing unit configures the controller circuit(s) to selectively access either the first memory or the second memory based on the map. In some cases, the first memory is a NOR-based memory, the second memory is a NAND flash memory, and the controller circuit is a serial peripheral interface (SPI) controller circuit. Selectively accessing the first memory or the second memory can include asserting a signal on a first or second chip select pin.

20 Claims, 6 Drawing Sheets

500

505 — INITIATE BOOT OF SYSTEM FROM NOR MEMORY

510 — CREATE ADDRESS MAP TO NOR MEMORY AND NAND MEMORY

515 — CONFIGURE CONTROLLER WITH INFORMATION FOR NOR MEMORY AND NAND MEMORY

SERIAL PERIPHERAL INTERFACE TO MULTIPLE MEMORY TYPES

BACKGROUND

Storage devices such as flash memories typically operate according to a serial peripheral interface (SPI) protocol for synchronous serial communication between devices. The storage devices are accessed by sending SPI commands to the storage device via an SPI controller, e.g., transmitting a command to write data to a flash memory or read data from the flash memory. In the case of a read command, the requested data is read back via a first-in-first-out (FIFO) buffer or a direct memory access (DMA) channel. There are two primary types of flash memory: NOR flash and NAND flash, which are named for the NOR (not OR) and NAND (not AND) logic gates used to implement the respective types of memories. A memory constructed based on NOR logic uses direct random access to individual bytes and is characterized by relatively fast read speeds, slow write speeds, and smaller overall memory sizes. In contrast, a memory constructed based on NAND logic implements serial access that supports faster write and erase speeds, as well as larger overall memory sizes, but slower read speeds (relative to NOR flash memory). Thus, NOR-based memory and NAND-based memory are typically used in different types of devices.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
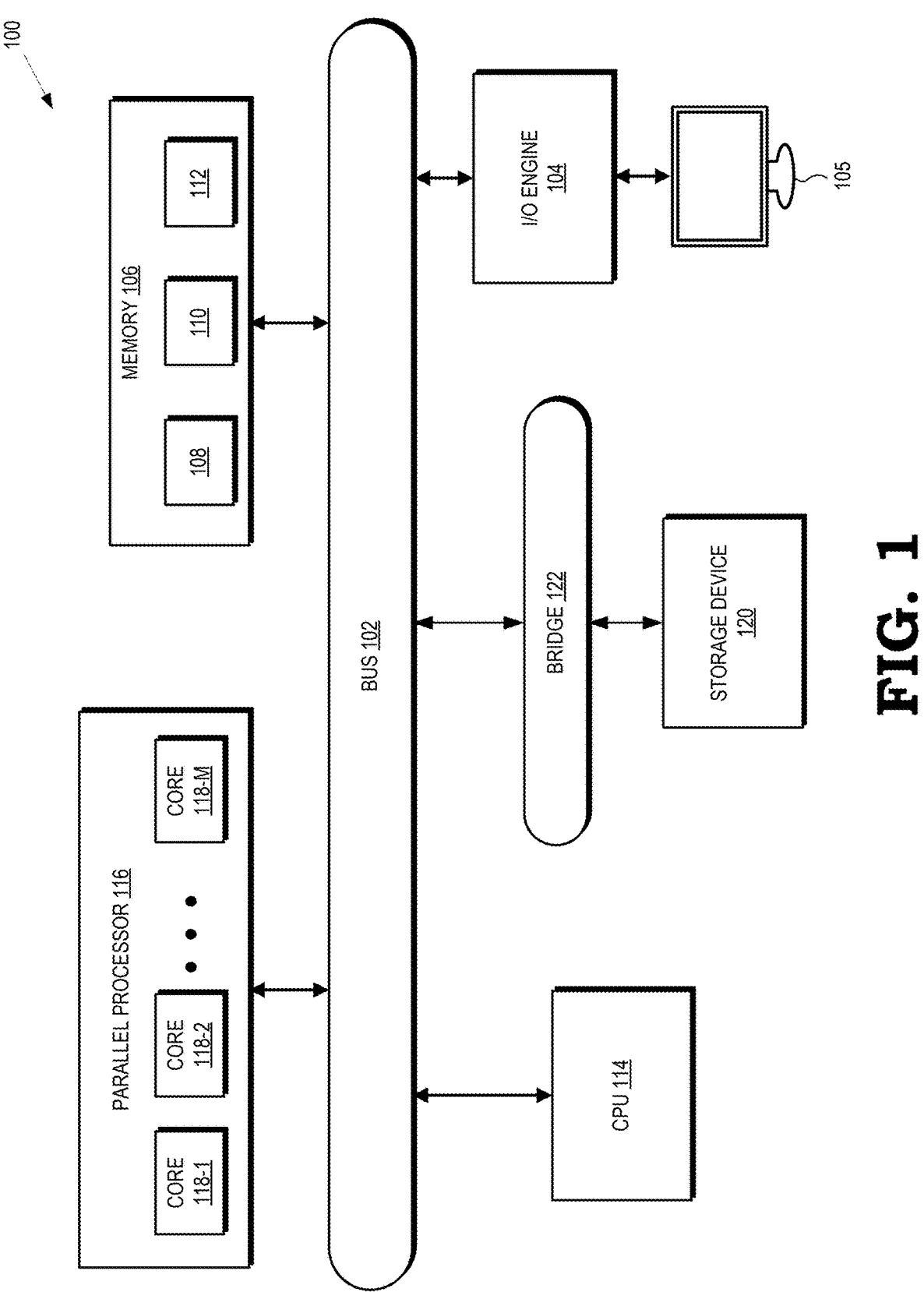
FIG. 1 illustrates a processing system that provides a common interface to multiple different types of memory according to some embodiments.

Processing systems, such as a system-on-a-chip (SoC), can store firmware and non-volatile data such as boot loaders, early platform code, and silicon initialization code on NOR flash memory to take advantage of its fast random-access read times. In addition, the processing system can execute source code directly from the NOR flash memory. Addresses of locations in the NOR flash memory are mapped to a portion of the processing system's address space, e.g., using memory-mapped input/output (MMIO) to map the memory and registers of the NOR flash memory to addresses used by the processing system. An SPI controller can therefore read data from the NOR flash memory and expose the data to the processing system in response to the processing system issuing a command to read data at a memory address in the portion of the MMIO region that is mapped to the NOR flash memory. However, the bandwidth available to convey information to and from the NOR flash memory is limited by the need to transmit commands to the SPI controller and, in the case of a read command, read back the data. Furthermore, larger storage devices and faster access are required to support increasing numbers of features and higher bandwidth requirements in many systems.

FIGS. 1-6 illustrate systems, apparatus, and methods that leverage the complementary advantages of NOR and NAND flash memories by providing a common interface for the two types of devices. In response to a signal to boot up a processing system, a processing unit in the processing system configures one or more controllers with information representing one or more memories of a first type (e.g., NOR flash memories) and one or more memories of a second type (e.g., NAND flash memories). The information representing the memories can include information indicating a type of the memory, a chip select pin corresponding to the memory, a size of the memory, and one or more commands supported by the type of memory. Locations or pages or entries in the one or more memories of the first type and the one or more memories of the second type are mapped to first and second address ranges in an address space used by the processing system, such as an MMIO address space. In response to receiving a memory access request including a memory address, the controller selects the one or more memories of the first type or the one or more memories of the second type based on whether the memory address is in the first address range or the second address range. For example, the controller can assert a signal on a first chip select pin associated with the first type of memory in response to the memory address being in the first range. For another example, the controller can assert a signal on the second chip select pin associated with the second type of memory in response to the memory address being in the second range. In some embodiments, different controllers are associated with the first and second types of memory. In that case, one of the controllers can be selected (e.g., by a primary controller or other processing unit) based on whether the memory address is in the first address range or the second address range. The selected controller then issues commands to its associated memory.

FIG. 1 illustrates a processing system 100 that provides a common interface to multiple different types of memory according to some embodiments. The processing system 100 includes a bus 102 implemented with circuitry that supports communication between entities implemented in the processing system 100. Some implementations of the processing system 100 include other buses, bridges, switches, routers, and the like, which are not shown in FIG. 1 in the interest of clarity. An input/output (I/O) engine 104 is implemented with circuitry that handles input or output operations associated with a display 105, as well as other elements of the processing system 100 such as keyboards, mice, printers, external disks, and the like. The I/O engine 104 is coupled to the bus 102 so that the I/O engine 104 can communicate with other entities in the processing system 100 by exchanging signals over the bus 102.

Processing system 100 also includes or has access to a memory 106 or other storage component implemented using a non-transitory computer-readable medium such as a dynamic random-access memory (DRAM). However, some embodiments of the memory 106 are implemented using other types of memory including, for example, static random-access memory (SRAM), nonvolatile RAM, and the like. Some embodiments of the memory 106 include an external memory implemented external to the processing units implemented in the processing system 100. Some embodiments of the memory 106 store information representing instructions such as program code 108 for one or more applications (e.g., graphics applications, compute applications, machine-learning applications), data 110 that is consumed by the program code 108, and results 112 produced by executing the program code 108.

The processing system 100 includes a central processing unit (CPU) 114 that is connected to the bus 102 to communicate with other entities in the processing system 100, such as the memory 106. The CPU 114 implements circuitry such as a plurality of processor cores (not shown in FIG. 1 in the interest of clarity) that execute instructions concurrently or in parallel. In some embodiments, one or more of the processor cores operate as single-instruction-multiple-data (SIMD) units that perform the same operation on different data sets concurrently or in parallel. The CPU 114 is configured to execute instructions such as the program code 108 for one or more applications, which is stored in the memory 106. Example of application include memory management applications, graphics applications, compute applications, and machine-learning applications. The CPU 114 can consume data 110 and store information in the memory 106 such as the results 112 of the executed instructions.

Some embodiments of the processing system 100 include a parallel processor 116. The parallel processor 116 can include, for example, a graphics processing unit (GPU), a general-purpose GPU (GPGPU), a neural processing unit (NPU), an intelligence processing unit (IPU) or other vector processor or parallel processor. The parallel processor 116 includes circuitry to implement one or more processor cores 118-1 . . . M that each operate as a compute unit configured to perform one or more operations based on one or more instructions received by the parallel processor 116. Although three processor cores 118 are shown in FIG. 1, more or fewer processor cores 118 can be implemented in other embodiments of the parallel processor 116. The compute units in the processor cores 118 are implemented as circuitry for one or more single-instruction, multiple data (SIMD) units that perform the same operation on different data sets to produce one or more results.

A storage device 120 is used to store information used by entities in the processing system including the CPU 114 or the parallel processor 116. In the illustrated embodiment, the storage device 120 is implemented as SPI storage that includes one or more memory components that can be accessed randomly and one or more memory components that are accessed in serial. For example, NOR-based circuitry can be used to implement memory components that are accessed randomly, and NAND-based circuitry can be used to implement memory components that are accessed in serial. As discussed herein, the storage device 120 includes or is connected to one or more controllers that support a common interface between the different types of memory components and other entities in the processing system 100. Some embodiments of the processing system 100 include a bridge 122 that is connected to the bus 102 to communicate with other entities in the processing system 100, such as the CPU 114 or the parallel processor 116. Some embodiments of the bridge 122 are implemented as a peripheral component interface (PCI) bridge or a PCI express (PCI-e) bridge. In the illustrated embodiment, the storage device 120 communicates with other entities in the processing system via the bridge 122. However, some embodiments of the storage device 120 can communicate using other bridges, buses, interfaces, or combinations thereof.

Memory locations or pages in the storage device 120 are accessed based on addresses of the locations or pages. Different sets or ranges of addresses are allocated to different portions or types of memory including the memory 106 and the memory components in the storage device 120. In some embodiments, the addresses of the memory locations are represented as virtual addresses that are included in memory access requests. The virtual addresses in the memory access requests are then translated to physical addresses in the memory 106, the storage device 120, or other memory components, e.g., using a translation lookaside buffer (TLB) and page table (not shown in FIG. 1 in the interest of clarity).

Some embodiments of the CPU 114 are configured to generate a map indicating the different ranges or sets of addresses that are allocated to memory components of different types in the storage device 120. For example, the map can indicate that a first set of addresses is allocated to NOR-based memory in the storage device 120 and a second set of addresses is allocated to NAND-based memory in the storage device 120. The CPU 114 can then configure one or more controllers or controller circuits in the storage device 120 (or in other entities in the processing system 100) to selectively access the different types of memory based on the map. In some embodiments, the CPU 114 also configures the storage device 120 based on characteristics of the different memory types. For example, the CPU 114 can configure the storage device 120 (or a corresponding controller) to store information indicating the types of the different memories in the storage device 120, chip select pins associated with the different types of memories, sizes of the different types of memories, and commands supported by the different types of memories. This information can be used to select or define the commands provided to the different types of memories, to format the commands, or to perform other actions related to communicating with the different types of memories.

Figure 2:
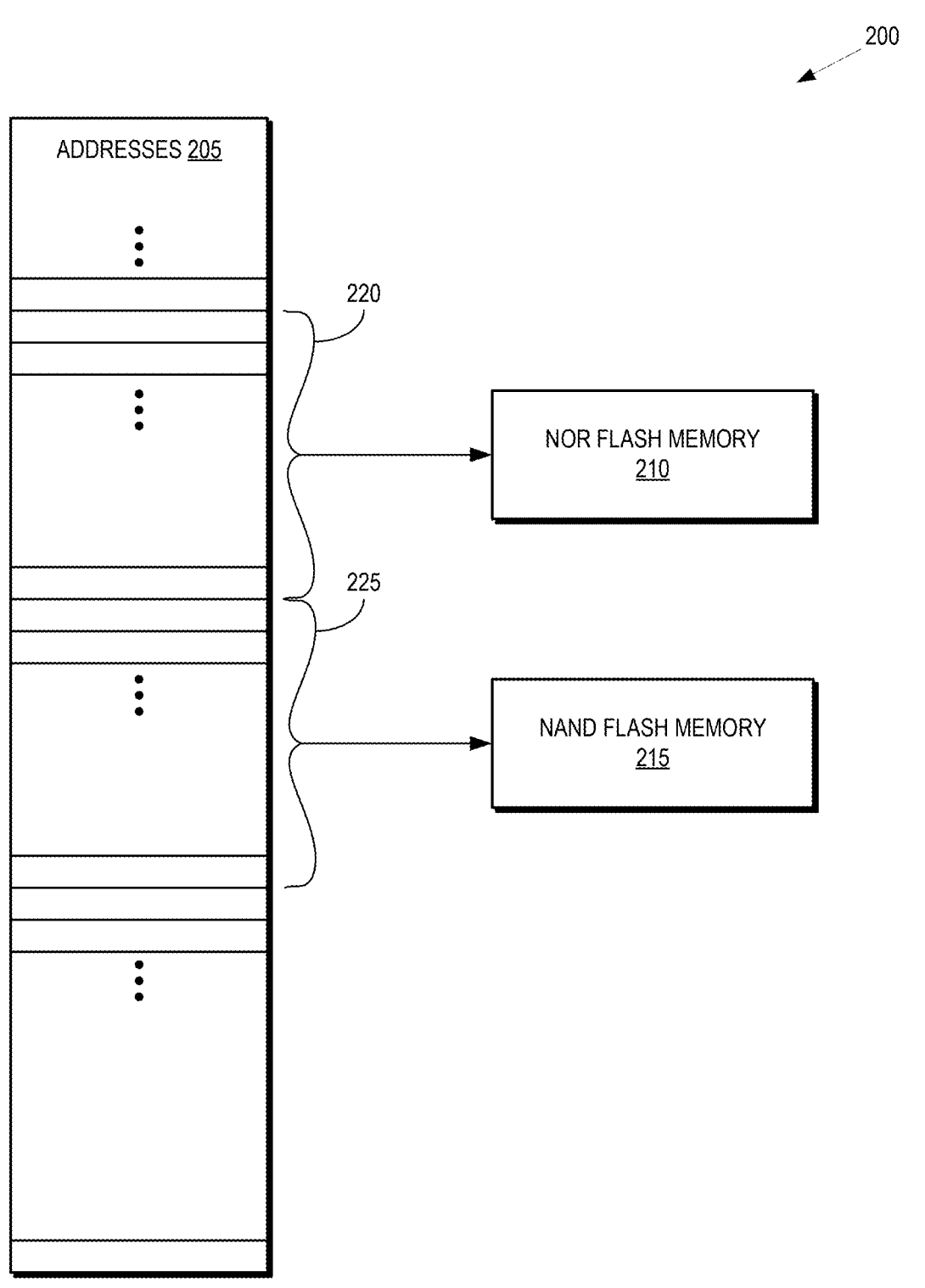
FIG. 2 illustrates a map of memory addresses to different types of memories according to some embodiments.

FIG. 2 illustrates a map 200 of memory addresses to different types of memories according to some embodiments. The map 200 is generated by some embodiments of the CPU 114 (or other processing units) in the processing system 100 shown in FIG. 1. In the illustrated embodiment, an address table 205 stores entries that indicate addresses of locations in a set of memories such as a NOR flash memory 210 (e.g., a flash memory that is implemented using NOR-based circuitry) and a NAND flash memory 215 (e.g., a flash memory that is implemented using NAND-based circuitry). For example, the address table 205 can be implemented as, or generated based upon, a page table that includes translations of virtual addresses to physical addresses of locations or pages in the set of memories.

The map 200 indicates a mapping of ranges of addresses to the different types of memories. In the illustrated embodiment, entries for addresses in the range 220 are mapped to the NOR flash memory 210 and entries for addresses in the range 225 are mapped to the NAND flash memory 215. Addresses outside the ranges 220, 225 can indicate locations in other types of memory either in or accessible to entities in the processing system. For example, addresses outside the ranges 220, 225 can indicate locations in DRAM such as the memory 106 shown in FIG. 1.

The map 200 is stored in (or accessible to) one or more controllers associated with the NOR flash memory 210 and the NAND flash memory 215. The controller(s) selectively send memory access requests to the NOR flash memory 210 or the NAND flash memory 215 based on a comparison of addresses in the memory access requests to the map 200. The controller(s) can bypass access to the other (unselected) one of the NOR flash memory 210 or the NAND flash memory 215. For example, a memory access request including an address in the range 220 is used to access the NOR flash memory 210 and bypass access to the NAND flash memory 215. For another example, a memory access request including an address in the range 225 is used to access the NAND flash memory 215 and bypass access to the NOR flash memory 210.

Figure 3:
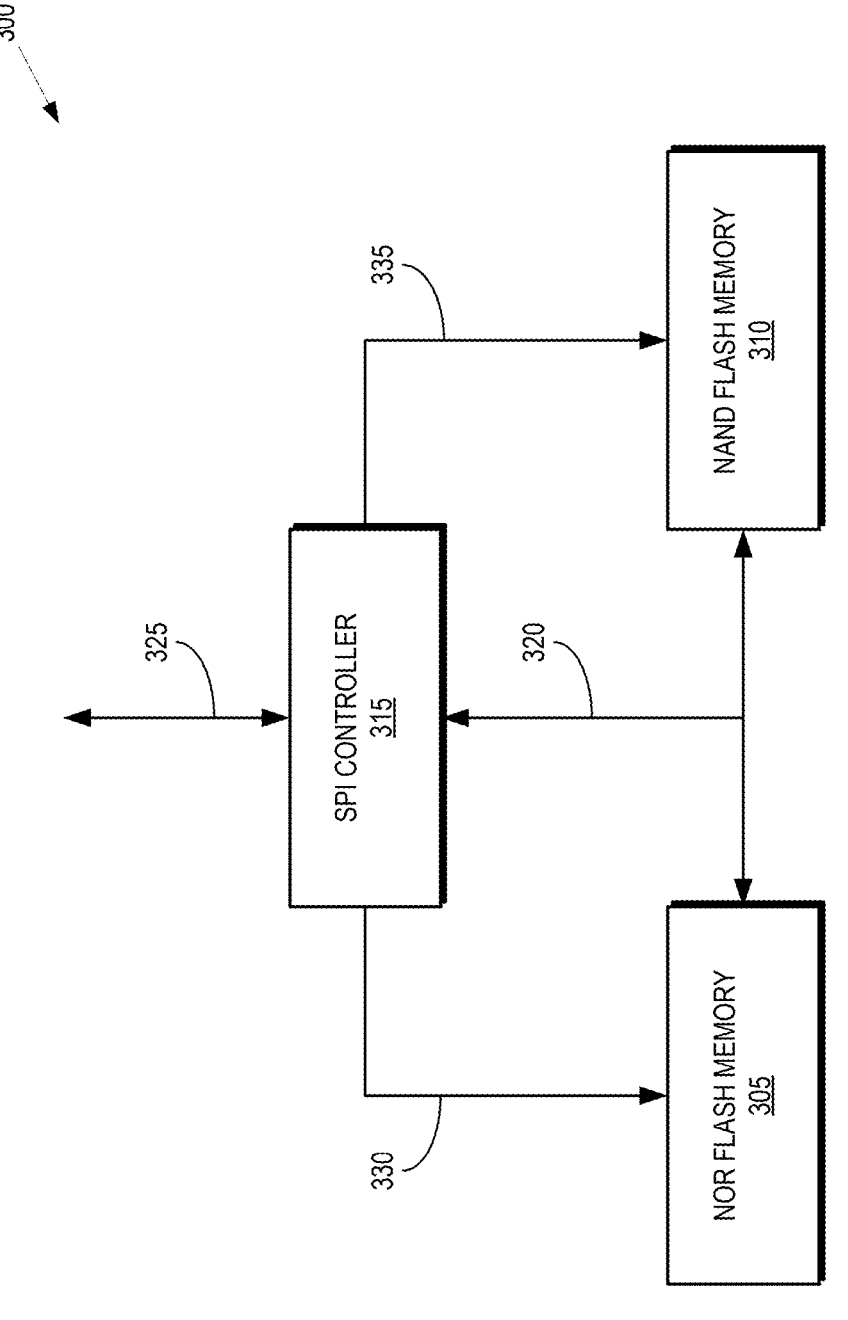
FIG. 3 illustrates a storage device that implements a common interface to multiple types of memory elements, according to some embodiments.

FIG. 3 illustrates a storage device 300 that implements a common interface to multiple types of memory elements, according to some embodiments. The storage device 300 is used to implement some embodiments of the storage device 120 shown in FIG. 1. In the illustrated embodiment, the storage device 300 includes a NOR flash memory 305 and a NAND flash memory 310, although the storage device 300 can also implement additional memory components of either type or a different type. The storage device 300 also includes a controller 315 that provides control signaling to the NOR flash memory 305 and the NAND flash memory 310, as well as issuing commands such as memory access requests to the NOR flash memory 305 or the NAND flash memory 310. In the case of a read access, the controller 315 receives data from the NOR flash memory 305 or the NAND flash memory 310. In the illustrated embodiment, the controller 315 is an SPI controller that communicates with the NOR flash memory 305 and the NAND flash memory 310 via a common interface 320 such as an SPI interface.

The controller 315 is configured by a processing unit (such as the CPU 114 shown in FIG. 1) based on signals received over an interface 325. Some embodiments of the controller 315 receive and store a copy of a map (such as the map 200 shown in FIG. 2) that indicates a mapping of sets or ranges of addresses to memory locations in different memories such as the NOR flash memory 305 and the NAND flash memory 310. As discussed herein, the NOR flash memory 305 and the NAND flash memory 310 are accessed using different commands that have different formats. Some embodiments of the controller 315 therefore receive and store information indicating the types of the different memories in the storage device 300, chip select pins 330, 335 associated with the different types of memories, sizes of the different types of memories, and commands supported by the different types of memories. This information can be used to select or define the commands provided to the different types of memories, to format the commands for transmission over the interface 320, or to perform other actions related to communicating with the different types of memories.

Memory access requests (or other commands) that are transmitted over the interface 320 are intended to be received by either the NOR flash memory 305 or the NAND flash memory 310, but not by both the NOR flash memory 305 and the NAND flash memory 310. The chip select pins 330, 335 are therefore used to indicate which of the NOR flash memory 305 and the NAND flash memory 310 is to monitor and receive signaling over the interface 320 and which of the NOR flash memory 305 and the NAND flash memory 310 is to bypass monitoring and reception of signaling over the interface 320. In the illustrated embodiment, the controller 315 asserts a signal (e.g., a "high" voltage or logical "1") on the chip select pin 330 to indicate that the NOR flash memory 305 is to monitor and receive signaling over the interface 320. The controller 315 does not assert a signal (e.g., maintains a "low" voltage or a logical "0") on the chip select pin 335 to indicate that the NAND flash memory 310 is to bypass monitoring reception of signaling over the interface 320. The controller 315 asserts a signal on the chip select pin 335 to indicate that the NAND flash memory 310 is to monitor and receive signaling over the interface 320. The controller 315 does not assert a signal on the chip select pin 330 to indicate that the NOR flash memory 305 is to bypass monitoring reception of signaling over the interface 320.

Once configured, the controller 315 can selectively access the NOR flash memory 305 or the NAND flash memory 310. For example, in response to an address in a memory access request being in a first set or range of addresses associated with the NOR flash memory 305, the controller 315 can assert a signal on the chip select pin 330 and then transmit random access memory requests over the interface 320. In some embodiments, the controller 315 formats the memory access requests based on the information that characterizes the NOR flash memory 305. The NOR flash memory 305 receives the random-access memory requests and the NAND flash memory 310 bypasses reception of the random-access memory requests. For another example, in response to an address in a memory access request being in a second set or range of addresses associated with the NAND flash memory 310, the controller 315 can assert a signal on the chip select pin 335 and then transmit serial access memory requests over the interface 320. In some embodiments, the controller 315 formats the memory access requests based on the information that characterizes the NAND flash memory 310. The NAND flash memory 310 receives the serial memory requests and the NOR flash memory 305 bypasses reception of the serial access memory requests.

Figure 4:
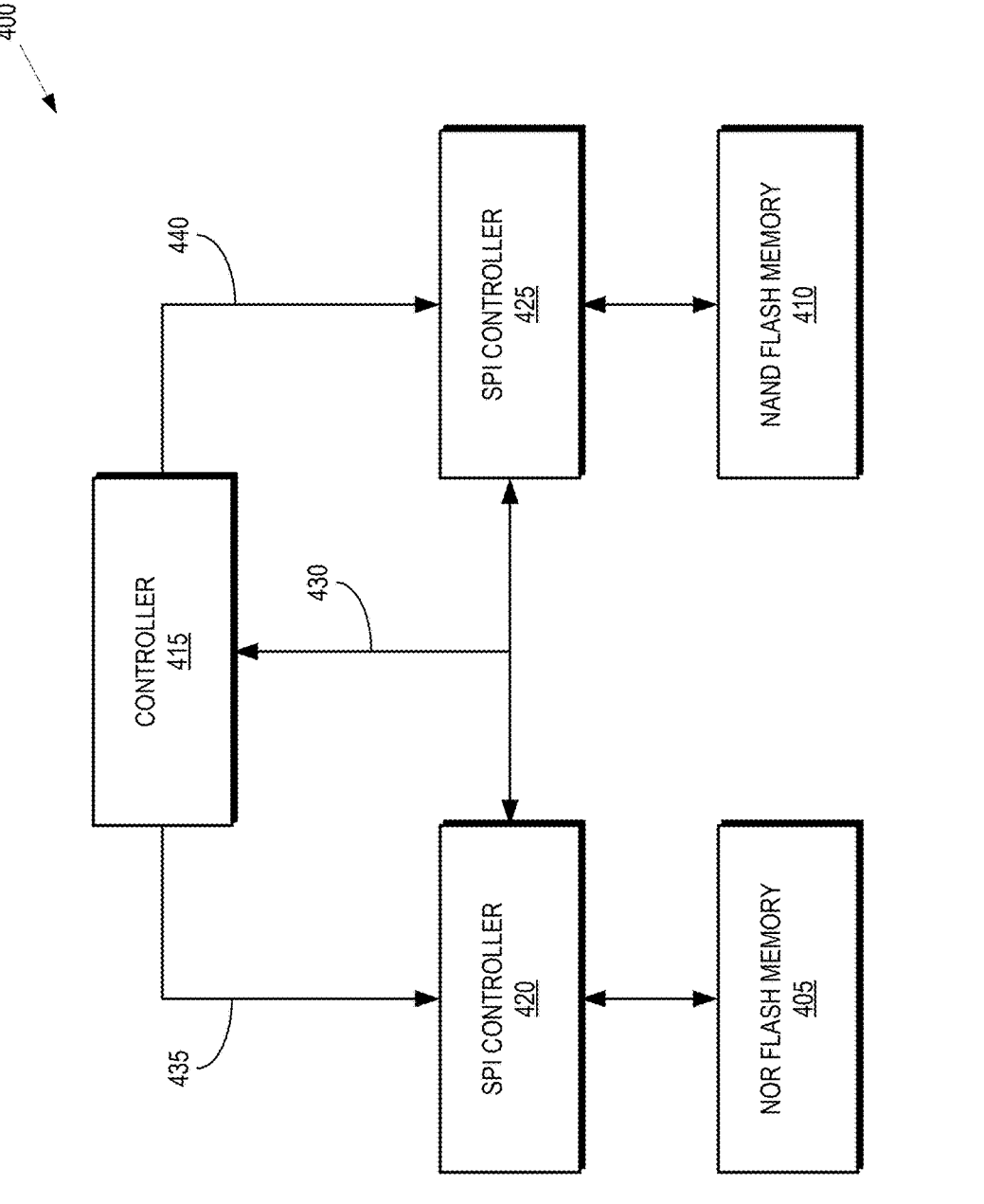
FIG. 4 illustrates a storage device that implements a common interface to different controllers of multiple types of memory elements, according to some embodiments.

FIG. 4 illustrates a storage device 400 that implements a common interface to different controllers of multiple types of memory elements, according to some embodiments. The storage device 400 is used to implement some embodiments of the storage device 120 shown in FIG. 1. In the illustrated embodiment, the storage device 400 includes a NOR flash memory 405 and a NAND flash memory 410, although the storage device 400 can also implement additional memory components of either type or a different type.

The storage device 400 differs from the storage device 300 shown in FIG. 3 because the storage device 400 includes a hierarchy of controllers that support the common interface to the NOR flash memory 405 and the NAND flash memory 410. A controller 415 is connected to controllers 420, 425, which are responsible for controlling the NOR flash memory 405 and the NAND flash memory 410, respectively. Some embodiments of the controllers 420, 425 are implemented as SPI controllers. The controller 415 is configured to selectively provide signaling, memory access requests, and other commands to the controllers 420, 425. The controller 415 is configured with a map (such as the map 200 shown in FIG. 2) that indicates sets or ranges of addresses associated with the NOR flash memory 405 and the NAND flash memory 410, as well as information that characterizes the different types of memory, as discussed herein.

The controller 415 communicates with the controllers 420, 425 over a common interface 430. As discussed herein, signaling, commands, or memory access requests intended for the controller 420 and/or the NOR flash memory 405 are not intended to be received by the controller 425 and/or the NAND flash memory 410. Conversely, signaling, commands, or memory access requests intended for the controller 425 and/or the NAND flash memory 410 are not intended to be received by the controller 420 and/or the NOR flash memory 405. The controller 415 therefore determines a target of the signaling, command, or memory access requests, e.g., by comparing an address of the target location to the map that indicates the mapping of addresses to different types of memory. Based on the target, the controller 415 asserts or de-asserts signals on corresponding chip select pins 435, 440 so that the appropriate type of memory monitors and receives the information while the other type of memory bypasses monitoring and reception of the information.

Figure 5:
FIG. 5 illustrates a method of configuring one or more controllers that support a common interface to multiple types of memory, according to some embodiments.
Figure 5:
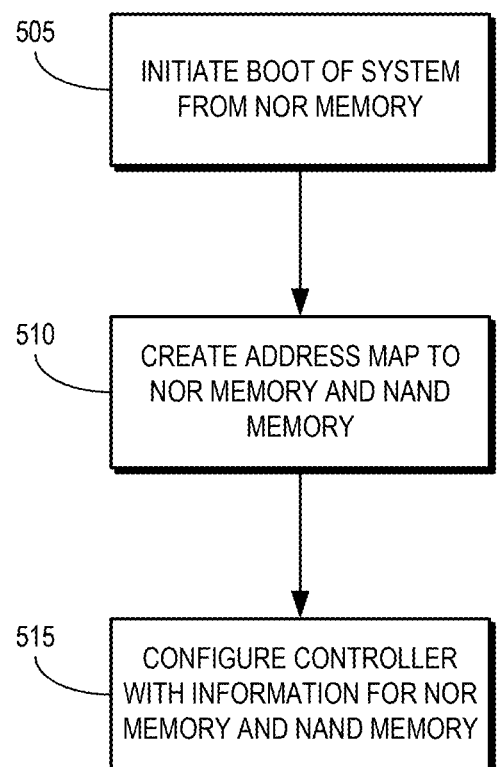

FIG. 5 illustrates a method 500 of configuring one or more controllers that support a common interface to multiple types of memory, according to some embodiments. The method 500 is used to configure some embodiments of controllers in the storage device 120 shown in FIG. 1, the controller 315 shown in FIG. 3, and the controllers 415, 420, 425 shown in FIG. 4. Some embodiments of the method 500 are performed in response to a processing system initiating a startup or boot process. For example, in a processing system that includes NOR-based memory and NAND-based memory, the method 500 is performed by executing code stored in the NOR-based memory in response to initiation of the boot process.

At block 505, the processing system initiates booting up the processing system from the NOR-based memory in the processing system. At block 510, a processing unit in a processing system, such as the CPU 114 shown in FIG. 1, creates or generates an address map that indicates sets or ranges of addresses associated with the NOR-based memory and the NAND-based memory. At block 515, the processing unit configures the one or more controllers. The configuration includes providing the address map to one or more of the controllers or providing the one or more controllers with access to the address map. In some embodiments, configuration of the one or more controllers also includes providing (or providing access to) information that characterizes the different memory types, such as sizes of the memories of the different types, commands used by the different memory types, and formats for the commands used by the different memory types.

Figure 6:
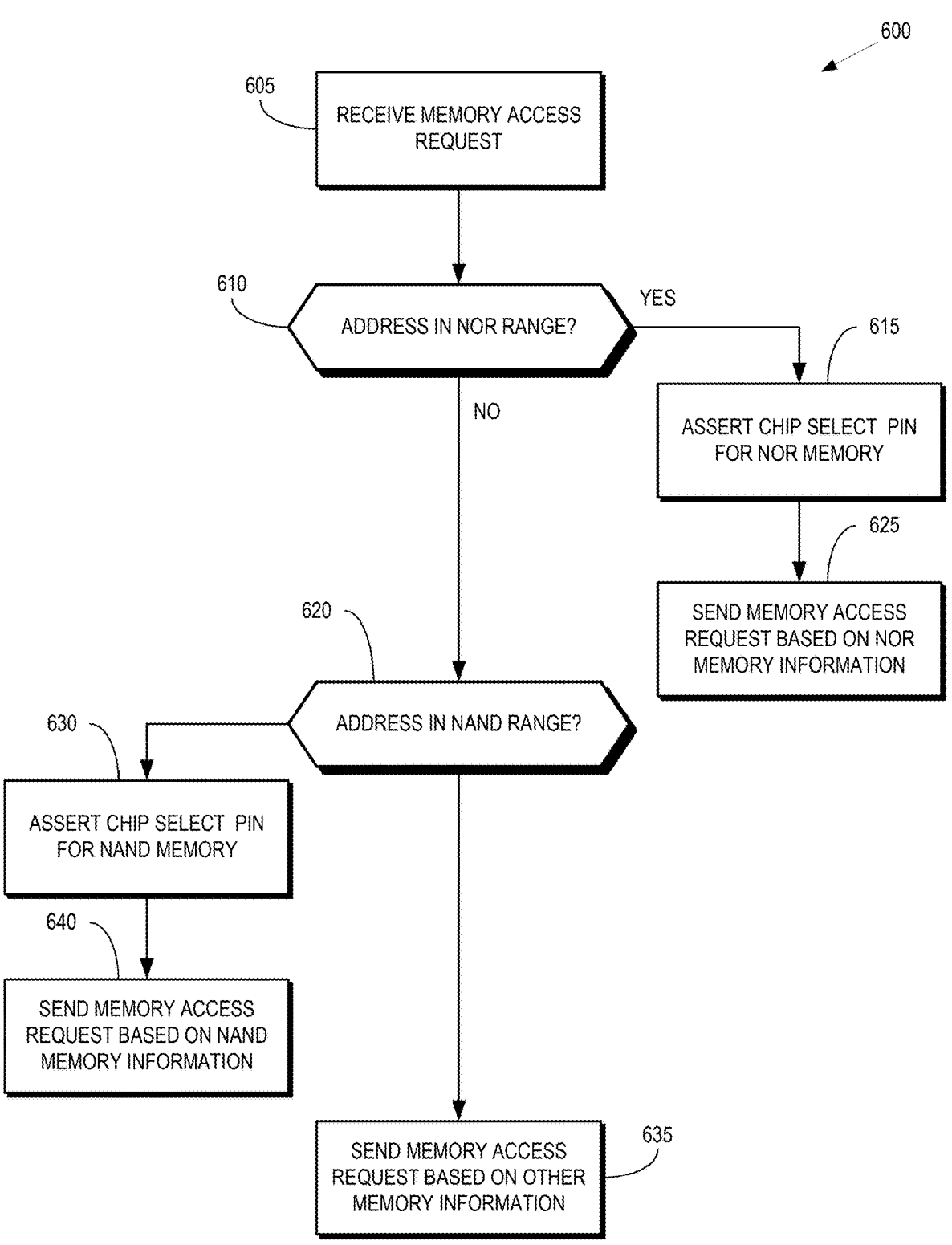
FIG. 6 illustrates a method of selectively accessing different types of memory via a common interface, according to some embodiments.

FIG. 6 illustrates a method 600 of selectively accessing different types of memory via a common interface, according to some embodiments. The method 600 is implemented by some embodiments of controllers in the storage device 120 shown in FIG. 1, the controller 315 shown in FIG. 3, and the controllers 415, 420, 425 shown in FIG. 4.

At block 605, the controller receives a memory access request that includes an address indicating a location within one of the multiple memory types. In the illustrated embodiment, the memory access request can include an address indicating a location within a NOR-based memory, a NAND-based memory, or another type of memory such as DRAM. As discussed herein, different types of memory support different access types (e.g., random access or serial access), different commands, and different command formats.

At decision block 610, the controller determines whether the address in the memory access request is within a range associated with the NOR-based memory. If so, the method 600 flows to the block 615. If the address is not in the range associated with the NOR-based memory, the method 600 flows to the decision block 620.

At block 615, the controller asserts a signal on the chip select pin associated with the NOR-based memory. The method 600 then flows to the block 625 and the controller sends the memory access request to the NOR-based memory based on the information for the NOR-based memory. For example, the controller can send a random-access memory access request that is formatted according to the format required for the NOR-based memory.

At decision block 620, the controller determines whether the address in the memory access request is within a range associated with the NAND-based memory. If so, the method 600 flows to the block 630. If the address is not in the range associated with the NAND-based memory, the method 600 flows to the block 635.

At block 630, the controller asserts a signal on the chip select pin associated with the NAND-based memory. The method 600 then flows to the block 640 and the controller sends the memory access request to the NAND-based memory based on the information for the NAND-based memory. For example, the controller can send a serial access memory access request that is formatted according to the format required for the NAND-based memory.

At block 635, the controller sends a memory access request to a location in the other memory indicated by the address in the memory access request. In some embodiments, the memory access request is formatted according to information associated with the other memory.

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the embodiments disclosed above may be altered or modified and all such variations are considered within the scope of the disclosed subject matter. Accordingly, the protection sought herein is as set forth in the claims below.

What is claimed is:

1. An apparatus comprising:
at least one controller circuit configured to be coupled to at least one first memory that implements random access and at least one second memory that implements serial access; and
at least one processing unit configured to:
generate a map indicating a first set of addresses allocated to the at least one first memory and a second set of addresses allocated to the at least one second memory, and
configure the at least one controller circuit to selectively access the at least one first memory or the at least one second memory based on the map,
wherein selectively accessing the at least one first memory or the at least one second memory comprises formatting a memory access request for either serial access or random access based on the map.

2. The apparatus of claim 1, wherein the at least one first memory is a NOR-based memory, wherein the at least one second memory is a NAND flash memory, and wherein the at least one controller circuit is at least one serial peripheral interface (SPI) controller circuit.

3. The apparatus of claim 1, wherein the at least one controller circuit is configured to receive the memory access request including a memory address and to selectively access the at least one first memory or the at least one second memory based on a comparison of the memory address and the map.

4. The apparatus of claim 3, wherein the at least one controller circuit is configured to selectively access the at least one first memory in response to the memory address being in the first set of addresses and to selectively access the at least one second memory in response to the memory address being in the second set of addresses.

5. The apparatus of claim 4, wherein the at least one processing unit is configured to provide first information representing a first type of the at least one first memory and second information representing a second type of the at least one second memory to the at least one controller circuit.

6. An apparatus comprising:
at least one controller circuit configured to be coupled to at least one first memory that implements random access and at least one second memory that implements serial access; and
at least one processing unit configured to:
to provide first information representing a first type of the at least one first memory and second information representing a second type of the at least one second memory to the at least one controller circuit, wherein the first information comprises information indicating at least one of a first chip select pin corresponding to the at least one first memory, at least one size of the at least one first memory, and at least one command supported by the at least one first memory, and wherein the second information comprises information indicating at least one of a second chip select pin corresponding to the at least one second memory, at least one size of the at least one second memory, and at least one command supported by the at least one second memory;

generate a map indicating a first set of addresses allocated to the at least one first memory and a second set of addresses allocated to the at least one second memory; and
configure the at least one controller circuit to selectively access the at least one first memory or the at least one second memory based on the map.

7. The apparatus of claim 6, wherein the at least one controller circuit is configured to assert a signal on the first chip select pin in response to a received memory address being in the first set of addresses, and wherein the at least one controller circuit is configured to assert a signal on the second chip select pin in response to the received memory address being in the second set of addresses.

8. The apparatus of claim 7, further comprising:
the at least one first memory, wherein the at least one first memory is configured to receive a memory access request from the at least one controller circuit in response to the signal being asserted on the first chip select pin and to bypass receiving the memory access request from the at least one controller circuit in response to the signal being asserted on the second chip select pin.

9. The apparatus of claim 8, wherein the at least one second memory is configured to receive the memory access request from the at least one controller circuit in response to the signal being asserted on the second chip select pin and to bypass receiving the memory access request from the at least one controller circuit in response to the signal being asserted on the first chip select pin.

10. A method comprising:
generating a map indicating a first set of addresses allocated to at least one first memory that implements random access and a second set of addresses allocated to at least one second memory that implements serial access; and
in response to receiving a memory access request, selectively accessing the at least one first memory or the at least one second memory based on the map, wherein selectively accessing the at least one first memory or the at least one second memory comprises formatting a memory access request for either serial access or random access based on the map.

11. The method of claim 10, wherein the at least one first memory is a NOR-based memory, and wherein the at least one second memory is a NAND flash memory.

12. The method of claim 10, further comprising:
receiving the memory access request including a memory address; and
selectively accessing the at least one first memory or the at least one second memory based on a comparison of the memory address and the map.

13. The method of claim 12, wherein selectively accessing the at least one first memory or the at least one second memory comprises selectively accessing the at least one first memory in response to the memory address being in the first set of addresses and selectively accessing the at least one second memory in response to the memory address being in the second set of addresses.

14. The method of claim 10, wherein formatting the memory access request comprises formatting memory access requests to the at least one first memory based on first information indicating at least one size of the at least one first memory or at least one command supported by the at least one first memory and formatting memory requests to the at least one second memory based on second information indicating at least one size of the second memory or at least one command supported by the at least one second memory.

15. The method of claim 10, wherein selectively accessing the at least one first memory or the at least one second memory comprises asserting a signal on at least one first chip select pin in response to a received memory address being in the first set of addresses or asserting a signal on at least one second chip select pin in response to the received memory address being in the second set of addresses.

16. The method of claim 15, further comprising:

receiving, at the at least one first memory, the memory access request in response to the signal being asserted on the at least one first chip select pin; and bypassing receiving the memory access request at the at least one first memory in response to the signal being asserted on the at least one second chip select pin.

17. The method of claim 15, further comprising:

receiving, at the at least one second memory, the memory access request in response to the signal being asserted on the at least one second chip select pin; and bypassing receiving the memory access request at the at least one second memory in response to the signal being asserted on the at least one first chip select pin.

18. An apparatus comprising:

at least one processing unit configured to generate a map indicating a first set of addresses allocated to at least one first memory that implements random access and a second set of addresses allocated to at least one second memory that implements serial access; and at least one controller circuit configured to access the at least one first memory or access the at least one second memory based on the map, wherein the at least one controller circuit is configured to access the at least one first memory by formatting a memory access request to the at least one first memory for random access and is configured to access the at least one second memory by formatting a memory access request to the at least one second memory for serial access.

19. The apparatus of claim 18, wherein the at least one controller circuit comprises a first controller circuit configured to randomly access the at least one first memory in response to receiving the memory access request comprising an address in the first set of addresses, and wherein the at least one controller circuit comprises a second controller circuit configured to serially access the at least one second memory in response to receiving a memory access request comprising an address in the second set of addresses.

20. The apparatus of claim 18, wherein the at least one processing unit is configured to boot up a processing system using the at least one first memory prior to generating the map.

* * * * *